J. UNDERWOOD.
Corn Planter.
No. 30,169.  Patented Sept. 25, 1860.
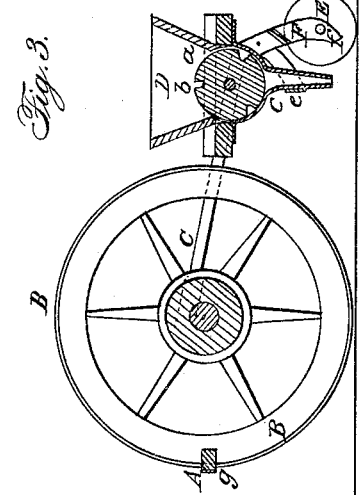
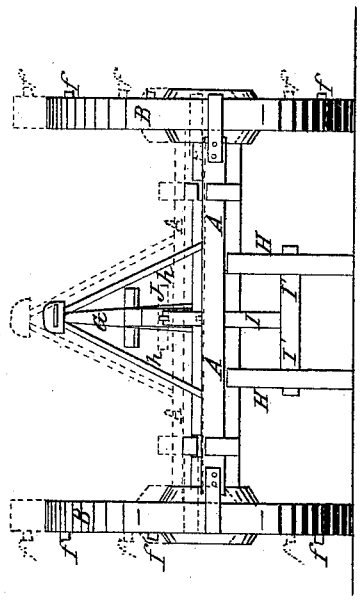
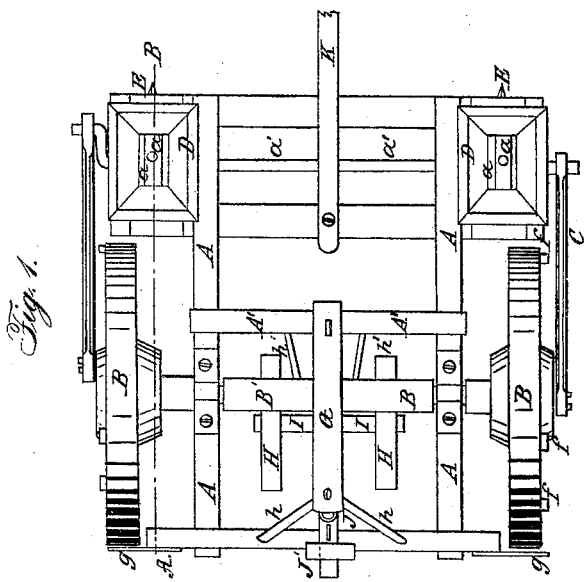
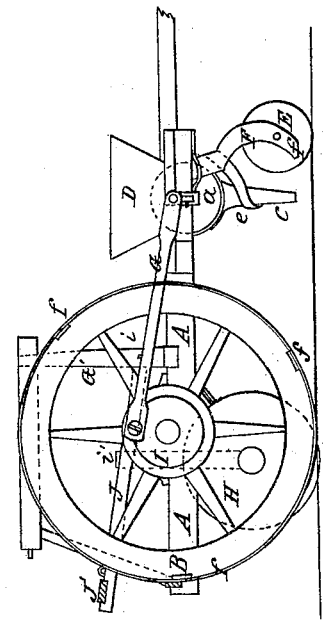
Witnesses:
Inventor:
John Underwood
By his Attorney
Thos. H. Dodge

UNITED STATES PATENT OFFICE.

JOHN UNDERWOOD, OF CAMERON, ILLINOIS.

IMPROVEMENT IN CORN-PLANTERS.

Specification forming part of Letters Patent No. 30,169, dated September 25, 1860.

*To all whom it may concern:*

Be it known that I, JOHN UNDERWOOD, of of Cameron, in the county of Warren, in the State of Illinois, have invented a certain new and useful Improvement in Corn-Planters, which I denominate "Underwood's Self-Dropping Corn-Planter;" and I do hereby declare that the following is a full, clear, and exact description of the same, reference being had to the accompanying drawings, which form a part of this specification, and in which—

Figure 1 represents a plan or top view of the machine. Fig. 2 represents a side view of the same. Fig. 3 represents a section on line A B, Fig. 1; and Fig. 4 represents a rear view of the machine, the black lines showing the position of the machine when moving forward, and the red lines the position of the frame when raised to back the machine to correct the rows or hills.

A A represent a rectangular frame, which is supported by large driving and marking wheels, B B, and small opening-wheels E E. The wheels B B are rigidly attached to one common axle or shaft, B', while the wheels E E turn on independent axles in hangers F, whose lower forks, $f'$, which pass on each side of the opening-wheels E, perform the function of clearing-wings to turn off clods and other large obstructions from the line of the hills.

To the front of the machine, and at each corner, are attached seed or corn boxes D D, in the bottom of each of which turns a dropping-wheel, $a$, provided with corn-cells $b$. The wheels $a$ $a$ are rigidly attached to a common shaft or axle, $a'$. Underneath each dropping-wheel $a$ is a feed-spout, $c$, which is fastened to the under side of the frame, and is also further strengthened by straps $e$. Shaft $a'$ is connected at each end by a crank and pitman with a wrist or pin on the wheels B, whereby motion is communicated to the dropping-wheels $a$ from wheels B by means of the pitmen C. The cranks on shaft $a'$ are set at right angles to each other, while the wrists or pins on wheels B occupy a similar position as respects each other. Consequently as the machine is drawn forward by tongues K a rotary motion is communicated to shaft $a'$ and its dropping-wheels $a$. The wheels B are provided with projecting markers $f$, which correspond in number with the number and position of the corn-cells in the dropping-wheels $a$.

The operation is as follows: Corn being put into the boxes D and the machine drawn forward, the sharp wedged-shaped wheels E cut into the ground and make a narrow channel in advance of the seed-spouts $c$ $c$, while the wings $f$ throw back any clods or other large obstructions from the surface of the ground. As the dropping-wheels revolve they empty the corn in the cells $b$ into the spouts $c$ $c$, down which it descends into the channels cut by the wheels E, while as the machine advances the wide wheels B are drawn over the narrow channels and force the earth to cover the corn in the bottom of the channels, after which it is pressed down smooth by the force of the wheels, while at the same time the markers $f$ indicate the exact spot where the hills of corn are planted.

It will thus be seen that I have devised a simple and effective machine for planting corn in rows, so that the field can be plowed both ways.

It sometimes happens that the machine gets jolted to one side or forward, and thus throws the hills of one row out of line with those already planted, when it becomes necessary to correct the hills, which is effected in my machine by the driver moving back on his seat G, so as to press with his weight on the end J' of the lever J, (which is pivoted to standard G' at $i$, and also at $i'$ to the upright I, which is rigidly attached to the axle or journal I' I', which is supported by wheels H H, and is also connected by draft-rods $h'$ $h'$ to the cross-pieces A', so that it can rise and fall, the draft-rods being connected to the piece A' by dead-eyes,) when the wheels H H are made to support the frame, and also the wheels B B, as fully shown in Fig. 4, when the machine can be backed without the wheels B touching the ground until the markers $f$ on wheels B are in line with the hills of the rows already planted, when the wheels B are let down upon the ground again, and the planting proceeded with as before.

It will be seen that my machine is not only simple, but very effective.

The opening wheels or cutters E E are not liable to clog up with stalks and grass, as the openers in general use.

Having described my improved corn-planter, what I claim, and desire to secure by Letters Patent, is—

The relative arrangement and combination of the adjusting-wheels H H with their frame, supporting and marking wheels B B, pitmen C C, dropping-wheels *a a*, and opening-wheels E E, operating as and for the purposes set forth.

In witness whereof I have hereunto signed my name.

JOHN UNDERWOOD.

Witnesses:
 M. R. JONES,
 N. A. BOYDSTON.